US008561716B2

(12) United States Patent
Aoki

(10) Patent No.: US 8,561,716 B2
(45) **Date of Patent: *Oct. 22, 2013**

(54) POWER TOOL

(75) Inventor: Yonosuke Aoki, Anjo (JP)

(73) Assignee: Makita Corporation, Anjo-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/532,584

(22) Filed: Jun. 25, 2012

(65) Prior Publication Data

US 2012/0261153 A1 Oct. 18, 2012

Related U.S. Application Data

(63) Continuation of application No. 12/588,077, filed on Oct. 2, 2009, now Pat. No. 8,235,138, which is a continuation of application No. 11/568,015, filed as application No. PCT/JP2005/015460 on Aug. 25, 2005, now Pat. No. 7,921,934.

(30) Foreign Application Priority Data

Aug. 27, 2004 (JP) ................................ 2004-249011

(51) Int. Cl.

| | |
|---|---|
| ***B25D 17/11*** | (2006.01) |
| ***B25D 17/24*** | (2006.01) |
| ***B25D 9/00*** | (2006.01) |
| ***B25D 11/00*** | (2006.01) |
| ***B25D 13/00*** | (2006.01) |
| ***B23B 45/16*** | (2006.01) |

(52) U.S. Cl.

USPC ....................................... 173/162.1; 173/211

(58) Field of Classification Search

USPC .................................................... 267/140.11

See application file for complete search history.

(56) References Cited

U.S. PATENT DOCUMENTS

| | | | |
|---|---|---|---|
| 1,667,271 | A | 4/1928 | Seaver |
| 1,711,688 | A | 5/1929 | O'Farrell |
| 1,845,825 | A | 2/1932 | Benedict |
| 1,902,530 | A | 3/1933 | Terry |
| 2,152,427 | A | 3/1939 | Wolf |
| 2,285,702 | A | 6/1942 | Forss |
| 2,875,731 | A | 3/1959 | Settles at al. |

(Continued)

FOREIGN PATENT DOCUMENTS

| | | | |
|---|---|---|---|
| CN | 1382562 | A | 12/2002 |
| DE | 815 179 | C1 | 7/1949 |

(Continued)

OTHER PUBLICATIONS

Jul. 20, 2011 Office Action issued in U.S. Appl. No. 12/801,399.

(Continued)

*Primary Examiner* — Robert Long

(74) *Attorney, Agent, or Firm* — Oliff and Berridge, PLC

(57) ABSTRACT

A power tool capable of performing vibration damping action in working operation, without an increase in size. The working tool includes a motor, a housing in which an internal mechanism driven by the motor is stored, a tool bit disposed on one end of the housing, a hand grip continuously connected to the other end of the housing, and a dynamic damper. The dynamic damper is disposed by utilizing a space between the housing and the internal mechanism so that the damping direction of the dynamic damper faces the longitudinal direction of the tool bit.

17 Claims, 12 Drawing Sheets

(56) References Cited

U.S. PATENT DOCUMENTS

| | | | | |
|---|---|---|---|---|
| 3,028,840 | A | 4/1962 | Leavell | |
| 3,170,523 | A | 2/1965 | Short | |
| 3,451,492 | A | 6/1969 | Ekstrom et al. | |
| 3,460,637 | A | 8/1969 | Schulin | |
| 3,845,827 | A * | 11/1974 | Schulin | 173/162.1 |
| 4,014,392 | A | 3/1977 | Ross | |
| 4,072,199 | A | 2/1978 | Wanner | |
| 4,279,091 | A | 7/1981 | Edwards | |
| 4,282,938 | A | 8/1981 | Minamidate | |
| 4,478,293 | A | 10/1984 | Weilenmann et al. | |
| 4,800,965 | A | 1/1989 | Keller | |
| 5,031,273 | A | 7/1991 | Yamaguchi | |
| 5,522,466 | A | 6/1996 | Harada et al. | |
| 5,678,641 | A | 10/1997 | Manschitz et al. | |
| 5,697,456 | A | 12/1997 | Radle et al. | |
| 5,775,440 | A | 7/1998 | Shinma | |
| 5,833,014 | A | 11/1998 | Dunn | |
| 5,842,527 | A | 12/1998 | Arakawa et al. | |
| 6,076,616 | A | 6/2000 | Kramp et al. | |
| 6,148,930 | A | 11/2000 | Berger et al. | |
| 6,286,610 | B1 | 9/2001 | Berger et al. | |
| 6,421,880 | B1 | 7/2002 | Prajapati et al. | |
| 6,742,998 | B2 * | 6/2004 | Kawahara et al. | 417/416 |
| 6,863,479 | B2 * | 3/2005 | Frauhammer et al. | 408/241 R |
| 6,887,146 | B2 * | 5/2005 | Staas et al. | 454/66 |
| 6,907,943 | B2 * | 6/2005 | Ikuta | 173/117 |
| 6,948,570 | B2 | 9/2005 | Kristen et al. | |
| 7,152,695 | B2 * | 12/2006 | Happ et al. | 173/217 |
| 7,252,157 | B2 * | 8/2007 | Aoki | 173/162.2 |
| 7,287,601 | B2 | 10/2007 | Hellbach et al. | |
| 7,322,428 | B2 * | 1/2008 | Bacila | 173/162.2 |
| 7,357,380 | B2 | 4/2008 | Menzel et al. | |
| 7,451,833 | B2 | 11/2008 | Hahn | |
| 7,500,527 | B2 | 3/2009 | Fischer et al. | |
| 8,434,565 | B2 * | 5/2013 | Hecht et al. | 173/162.1 |
| 2002/0185288 | A1 | 12/2002 | Hanke et al. | |
| 2003/0037937 | A1 | 2/2003 | Frauhammer et al. | |
| 2004/0206520 | A1 | 10/2004 | Ikuta | |
| 2005/0284646 | A1 | 12/2005 | Bacila | |
| 2008/0185165 | A1 | 8/2008 | Moessnang | |
| 2009/0025949 | A1 | 1/2009 | Aoki | |
| 2009/0090528 | A1 | 4/2009 | Manschitz et al. | |
| 2009/0151967 | A1 | 6/2009 | Haas et al. | |

FOREIGN PATENT DOCUMENTS

| | | | |
|---|---|---|---|
| EP | A 0 066 779 | | 12/1982 |
| EP | 1 238 759 | A1 | 9/2002 |
| EP | 1 252 976 | A1 | 10/2002 |
| EP | 1 415 768 | A1 | 5/2004 |
| EP | 1 464 449 | A2 | 10/2004 |
| EP | 1 736 283 | A2 | 12/2006 |
| FR | A 2 237 734 | | 2/1975 |
| GB | 2 086 005 | A | 5/1982 |
| JP | A-52-109673 | | 9/1977 |
| JP | A-57-66879 | | 4/1982 |
| JP | A-61-178188 | | 8/1986 |
| JP | A-01-274972 | | 11/1989 |
| JP | A-01-274973 | | 11/1989 |
| JP | A-9-57652 | | 3/1997 |
| JP | A-2003-11073 | | 1/2003 |
| JP | A-2004-216524 | | 8/2004 |
| RU | 2 084 329 | C1 | 7/1997 |
| SU | 210043 | | 1/1968 |
| WO | WO 2005/105386 | A1 | 11/2005 |

OTHER PUBLICATIONS

European Search Report issued Dec. 6, 2010 in European Patent Application No. 10 18 2454.
Office Action issued Dec. 28, 2010 in U.S. Appl. No. 12/801,399.
Jul. 28, 2010 Office Action issued in U.S. Appl. No. 11/568,015.
May 10, 2010 Notice of Reasons for Rejection issued in JP 2004-249011 with English-language translation.
Jan. 7, 2010 Office Action issued in U.S. Appl. No. 11/568,015.

* cited by examiner

POWER TOOL

CROSS-REFERENCE TO RELATED APPLICATION

This application is a continuation of U.S. patent application Ser. No. 12/588,077, filed on Oct. 2, 2009, which is a continuation of U.S. patent application Ser. No. 11/568,015, filed on Oct. 17, 2006, which is a National Stage of PCT/JP2005/015460, filed on Aug. 25, 2005, which claims priority to Japanese Application No. 2004-249011 filed on Aug. 27,2004. The entire disclosures of the prior applications are hereby incorporated herein by reference in their entirety.

BACKGROUND

The present invention relates to a technique for reducing vibration in a reciprocating power tool, such as a hammer and a hammer drill, which linearly drives a tool bit.

Japanese non-examined laid-open Patent Publication No. 52-109673 discloses an electric hammer having a vibration reducing device. In the known electric hammer, a vibration proof chamber is integrally formed with a body housing (and a motor housing) in a region on the lower side of the body housing and forward of the motor housing. A dynamic vibration reducer is disposed within the vibration proof chamber.

In the above-mentioned known electric hammer, the vibration proof chamber that houses the dynamic vibration reducer is provided in the housing in order to provide an additional function of reducing vibration in operation. As a result, however, the electric hammer increases in size.

SUMMARY

Object of the Invention

It is, accordingly, an object of the present invention to provide an effective technique for reducing vibration in operation, while avoiding size increase of a power tool.

Subject-Matter of the Invention

The above-described object is achieved by the features of claimed invention. The invention provides a power tool which includes a motor, an internal mechanism driven by the motor, a housing that houses the motor and the internal mechanism, a tool bit disposed in one end of the housing and driven by the internal mechanism in its longitudinal direction to thereby perform a predetermined operation, a handgrip connected to the other end of the housing, and a dynamic vibration reducer including a weight and an elastic element. The elastic element is disposed between the weight and the housing and adapted to apply a biasing force to the weight. The weight reciprocates in the longitudinal direction of the tool bit against the biasing force of the elastic element. By the reciprocating movement of the weight, the dynamic vibration reducer reduces vibration which is caused in the housing in the longitudinal direction of the tool bit in the operation.

The "power tool" may particularly includes power tools, such as a hammer, a hammer drill, a jigsaw and a reciprocating saw, in which a tool bit performs a operation on a workpiece by reciprocating. When the power tool is a hammer or a hammer drill, the "internal mechanism" according to this invention comprises a motion converting mechanism that converts the rotating output of the motor to linear motion and drives the tool bit in its longitudinal direction, and a power transmitting mechanism that appropriately reduces the speed of the rotating output of the motor and transmits the rotating output as rotation to the tool bit.

In the present invention, the dynamic vibration reducer is disposed in the power tool by utilizing a space within the housing the handgrip. Therefore, the dynamic vibration reducer can perform a vibration reducing action in operation, while avoiding size increase of the power tool. Further, the dynamic vibration reducer can be protected from an outside impact, for example, in the event of drop of the power tool. The manner in which the dynamic vibration reducer is "disposed by utilizing a space between the housing and the internal mechanism" includes not only the manner in which the dynamic vibration reducer is disposed by utilizing the space as-is, but also the manner in which it is disposed by utilizing the space changed in shape.

The present invention will be more apparent from the following detailed description and the drawings.

DETAILED DESCRIPTION OF EMBODIMENTS

Figure 1A:
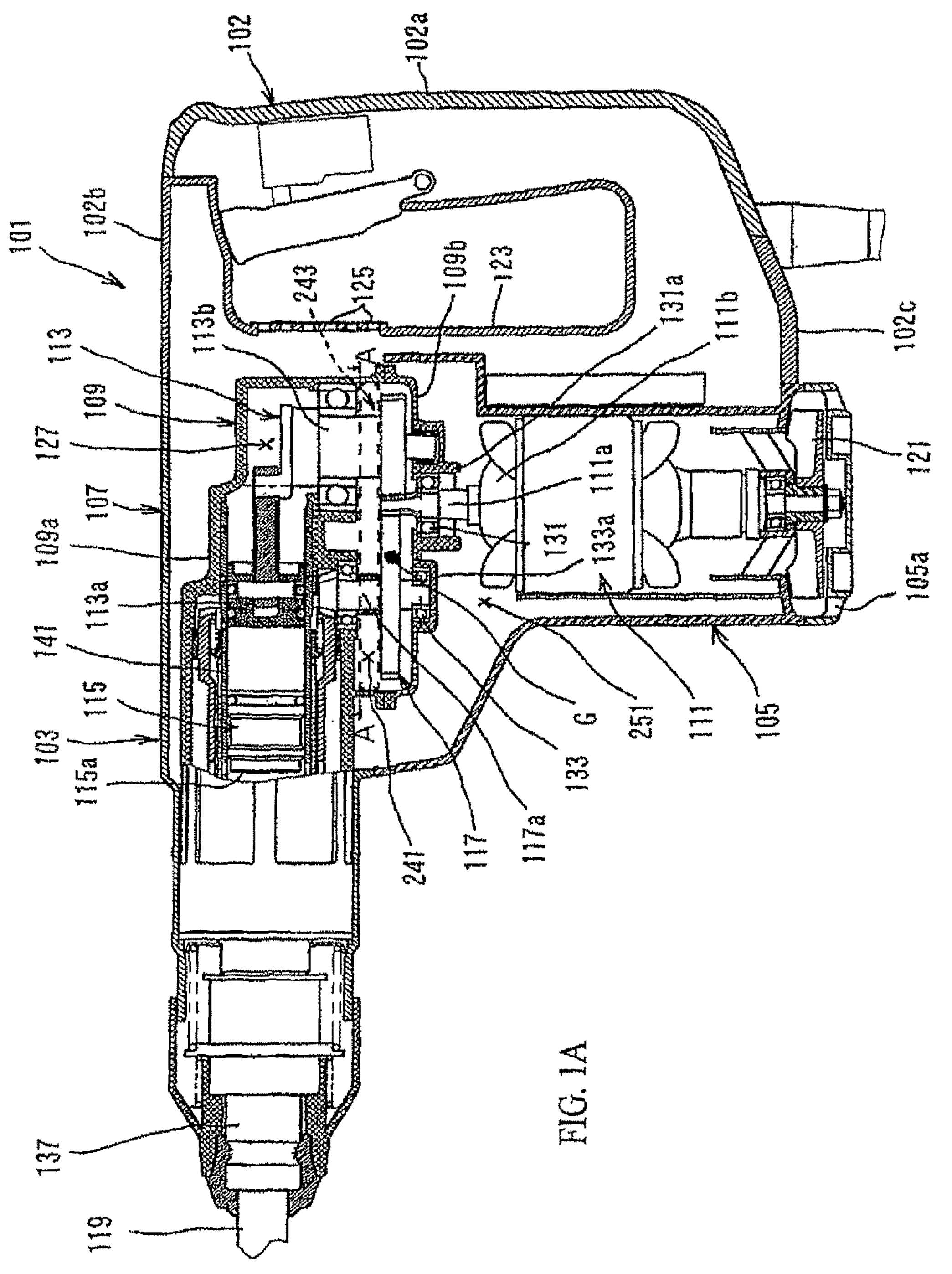
FIG. 1A is a side view showing a hammer drill according to an embodiment of the invention, with an outer housing and an inner housing shown in section.

Representative embodiments of the present invention will now be described with reference to FIGS. 1A to 7. In each embodiment, an electric hammer drill will be explained as a representative example of a power tool according to the present invention. Each of the embodiments features a dynamic vibration reducer disposed in a space within a housing or a handgrip. Before a detailed explanation of placement of the dynamic vibration reducer, the configuration of the hammer drill will be briefly described with reference to FIG. 1A. The hammer drill 101 mainly includes a body 103, a hammer bit 119 detachably coupled to the tip end region (on the left side as viewed in FIG. 1A) of the body 103 via a tool holder 137, and a 102 connected to a region of the body 103 on the opposite side of the hammer bit 119. The body 103, the hammer bit 119 and the 102 are features that correspond to the "housing", the "tool bit" and the "handgrip", respectively, according to the present invention.

The body 103 of the hammer drill 101 mainly includes a motor housing 105, a crank housing 107, and an inner housing 109 that is housed within the motor housing 105 and the crank housing 107. The motor housing 105 and the crank housing 107 are features that correspond to the "outer housing" according to this invention, and the inner housing 109 corresponds to the "inner housing". The motor housing 105 is located on the lower part of the handgrip 102 toward the front and houses a driving motor 111. The driving motor 111 is a feature that corresponds to the "motor" according to this invention, In the present embodiments, for the sake of convenience of explanation, in the state of use in which the user holds the 102, the side of the hammer bit 119 is taken as the front side and the side of the 102 as the rear side. Further, the side of the driving motor 111 is taken as the lower side and the opposite side as the upper side; the vertical direction and the horizontal direction which are perpendicular to the longitudinal direction are taken as the vertical direction and the lateral direction, respectively.

The crank housing 107 is located on the upper part of the 102 toward the front and butt joined to the motor housing 105 from above. The crank housing 107 houses the inner housing 109 together with the motor housing 105. The inner housing 109 houses a cylinder 141, a motion converting mechanism 113, and a gear-type power transmitting mechanism 117. The cylinder 141 houses a striking element 115 that is driven to apply a striking force to the hammer bit 119 in its longitudinal direction. The motion converting mechanism 113 comprises a crank mechanism and converts the rotating output of the driving motor 111 to linear motion and then drives the striking element 115 via an air spring. The power transmitting mechanism 117 transmits the rotating output of the driving motor 111 as rotation to the hammer bit 119 via a tool holder 137. Further, the inner housing 109 includes an upper housing 109*a* and a lower housing 109*b*. The upper housing 109*a* houses the entire cylinder 141 and most of the motion converting mechanism 113 and power transmitting mechanism 117, while the lower housing 109*b* houses the rest of the motion converting mechanism 113 and power transmitting mechanism 117. The motion converting mechanism 113, the striking element 115 and the power transmitting mechanism 117 are features that correspond to the "internal mechanism" according to this invention.

The motion converting mechanism 113 appropriately converts the rotating output of the driving motor 111 to linear motion and then transmits it to the element 115. As a result, an impact force is generated in the longitudinal direction of the hammer bit 119 via the striking element 115. The striking element 115 includes a striker 115*a* and an intermediate element in the form of an impact bolt (not shown). The striker 115*a* is driven by the sliding movement of a piston 113*a* of the motion converting mechanism 113 via the action of air spring within the cylinder 141. Further, the power transmitting mechanism 117 appropriately reduces the speed of the rotating output of the driving motor 111 and transmits the rotating output as rotation to the hammer bit 119. Thus, the hammer bit 119 is caused to rotate in its circumferential direction. The hammer drill 101 can be switched by appropriate operation of the user between a hammer mode in which a working operation is performed on a workpiece by applying only a striking force to the hammer bit 119 in the longitudinal direction, and a hammer drill mode in which a operation is performed on a workpiece by applying an longitudinal force and a circumferential rotating force to the 25 hammer bit 119.

The hammering operation in which a striking force is applied to the hammer bit 119 in the longitudinal direction by the motion converting mechanism 113 and the striking element 115, and the hammer-drill operation in which a rotating force is applied to the hammer bit 119 in the circumferential direction by the power transmitting mechanism 117 in addition to the striking force in the longitudinal direction are known in the art. Also, the mode change between the hammer mode and the hammer drill mode is known in the art. These known techniques are not directly related to this invention and therefore will not be described in further detail.

The hammer bit 119 moves in the longitudinal direction on the axis of the cylinder 141. Further, the driving motor 111 is disposed such that the axis of an output shaft 111*a* is perpendicular to the axis of the cylinder 141. The inner housing 109 is disposed above the driving motor 111.

The handgrip 102 includes a grip 102*a* to be held by the user and an upper and a lower connecting portions 102*b*, 102*c* that connect the grip 102*a* to the rear end of the body 103. The grip 102*a* vertically extends and is opposed to the rear end of the body 103 with a predetermined spacing. In this state, the grip 102*a* is detachably connected to the rear end of the body 103 via the upper and lower connecting portions A dynamic vibration reducer 151 is provided in the hammer drill 101 in order to reduce vibration which is caused in the hammer drill 101, particularly in the longitudinal direction of the hammer bit 119, during hammering or hammer-drill operation. The dynamic vibration reducer 151 is shown as an example in FIGS. 2A-2F and 3 in sectional view. The dynamic vibration reducer 151 mainly includes a box-like (or cylindrical) vibration reducer body 153, a weight 155 and biasing springs 157 disposed on the front and rear sides of the weight 155. The weight 155 is disposed within the vibration reducer body 153 and can move in the longitudinal direction of the vibration reducer body 153. The biasing spring 157 is a feature that corresponds to the "elastic element" according to the present invention. The biasing spring 157 applies a spring force to the weight 155 when the weight 155 moves in the longitudinal direction of the vibration reducer body 153.

Placement of the dynamic vibration reducer 151 will now be explained with respect to 10 each embodiment.

(First Embodiment)

Figure 2A:
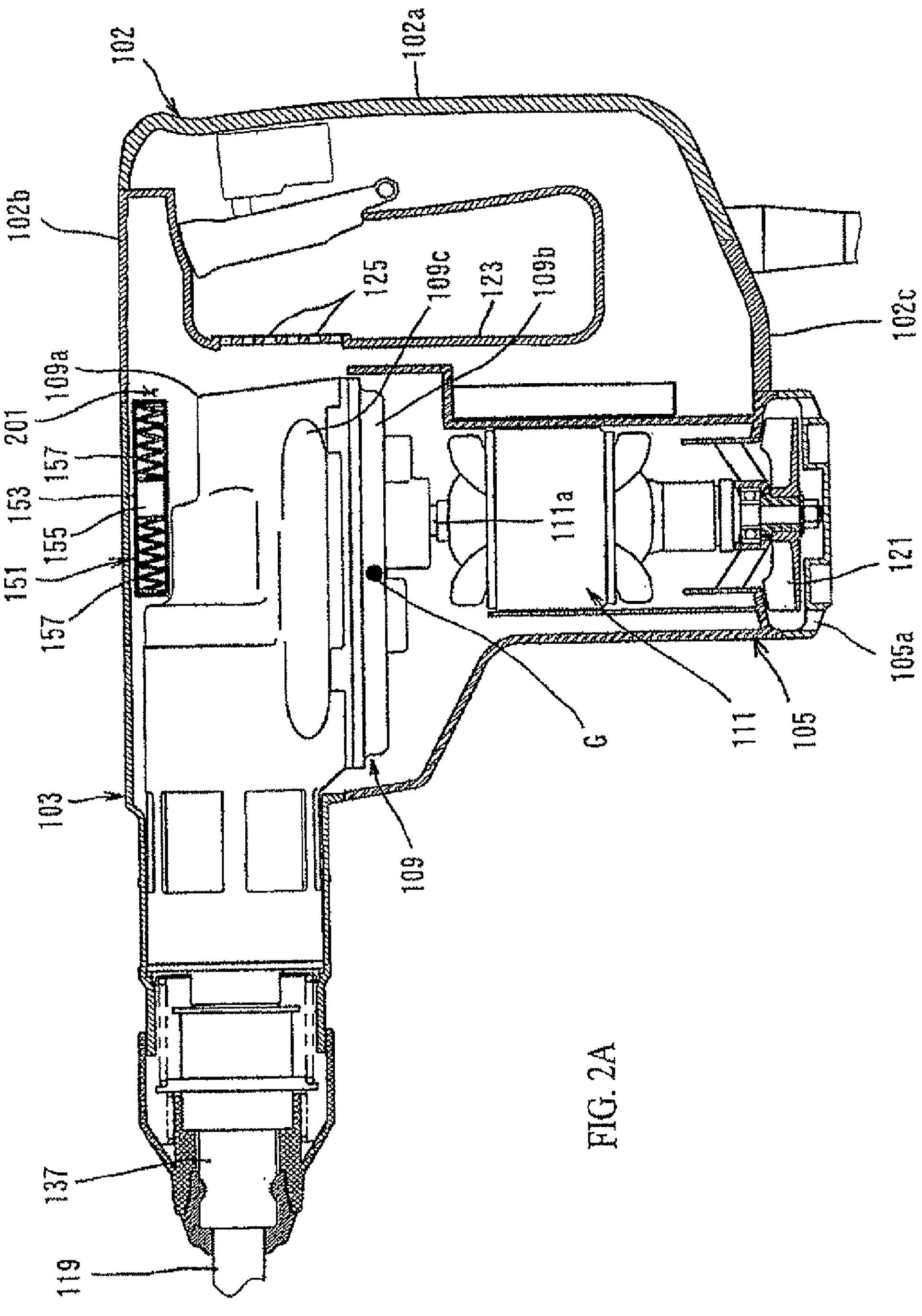
FIG. 2A is a side view of the hammer drill, with the outer housing shown in section according to an embodiment of the invention.
Figure 3:
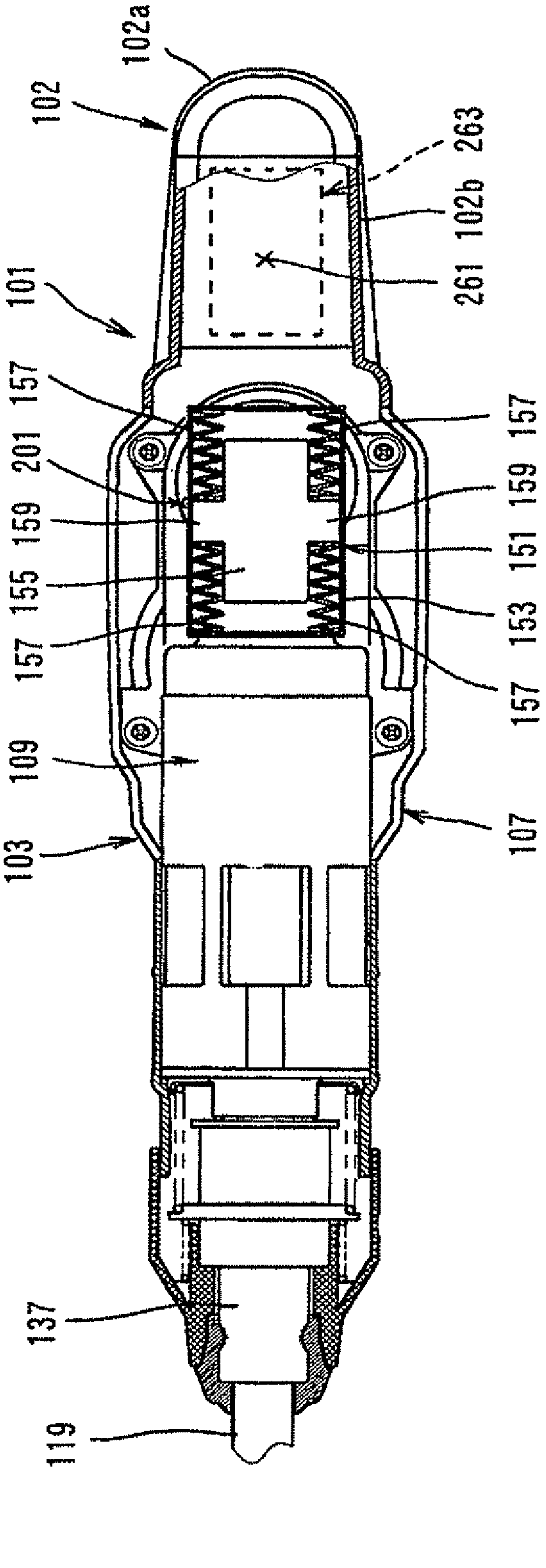
FIG. 3 is a plan view of the hammer drill, with the outer housing shown in section.

In the first embodiment, as shown in FIGS. 2A and 3, the dynamic vibration reducer 151 is disposed by utilizing a space in the upper region inside the body 103, or more specifically, a space 201 existing between the inner wall surface of the upper region of the crank housing 107 and the outer wall surface of the upper region of an upper housing 109*a* of the inner housing 109. The dynamic vibration reducer 151 is disposed in the space 201 such that the direction of movement of the weight 155 or the vibration reducing direction coincides with the longitudinal direction of the hammer bit 119. The space 201 is dimensioned to be larger in the horizontal directions (the longitudinal and lateral directions) than in the vertical direction (the direction of the height). Therefore, in this embodiment, the dynamic vibration reducer 151 has a shape conforming to the space 201. Specifically, as shown in sectional view, the vibration reducer body 153 has a box-like shape short in the vertical direction and long in the longitudinal direction. Further, projections 159 are formed on the right and left sides of the weight 155 in the middle in the longitudinal direction. The biasing springs 157 are disposed between the projections 159 and the front end and the rear end of the vibration reducer body 153. Thus, the amount of travel of the weight 155 can be maximized while the longitudinal length of the vibration reducer body 153 can be minimized. Further, the movement of the weight 155 can be stabilized.

Thus, in the first embodiment, the dynamic vibration reducer 151 is disposed by utilizing the space 201 existing within the body 103. As a result, vibration caused in operation of the hammer drill 101 can be reduced by the vibration reducing action of the dynamic vibration reducer 151, while size increase of the body 103 can be avoided. Further, by placement of the dynamic vibration reducer 151 within the body 103, the dynamic vibration reducer 151 can be protected from an outside impact in the event of drop of the hammer drill 101.

As shown in FIG. 2A, generally, a center of gravity G of the hammer drill 101 is located below the axis of the cylinder 141 and slightly forward of the axis of the driving motor 111. Therefore, when, like this embodiment, the dynamic vibration reducer 151 is disposed within the space 201 existing between the inner wall surface of the upper region of the crank housing 107 and the outer wall surface of the upper region of the upper housing 109*a* of the inner housing 109, the dynamic vibration reducer 151 is disposed on the side of the axis of the cylinder 141 which is opposite to the center of gravity G of the hammer drill 101. Thus, the center of gravity G of the hammer drill 101 is located closer to the axis of the cylinder 141, which is effective in lessening or preventing vibration in the vertical direction. Further, the dynamic vibration reducer 151 disposed in the space 201 is located relatively near to the axis of the cylinder 141, so that it can perform an effective vibration reducing action against vibration in operation using the hammer drill 101.

(Second Embodiment)

Figure 2B:
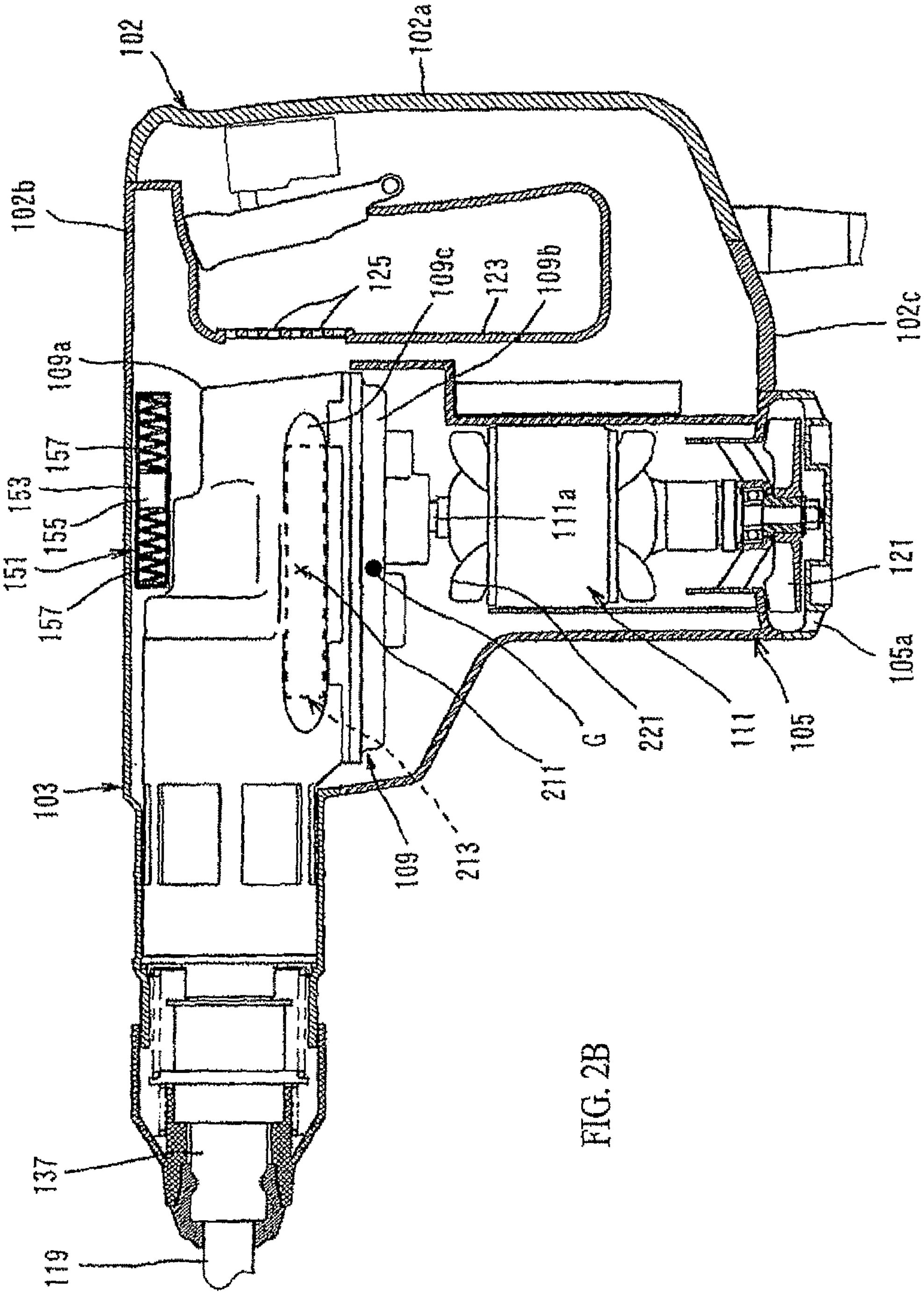
FIG. 2B is a side view of the hammer drill, with the outer housing shown in section according to another embodiment of the invention.
Figure 5:
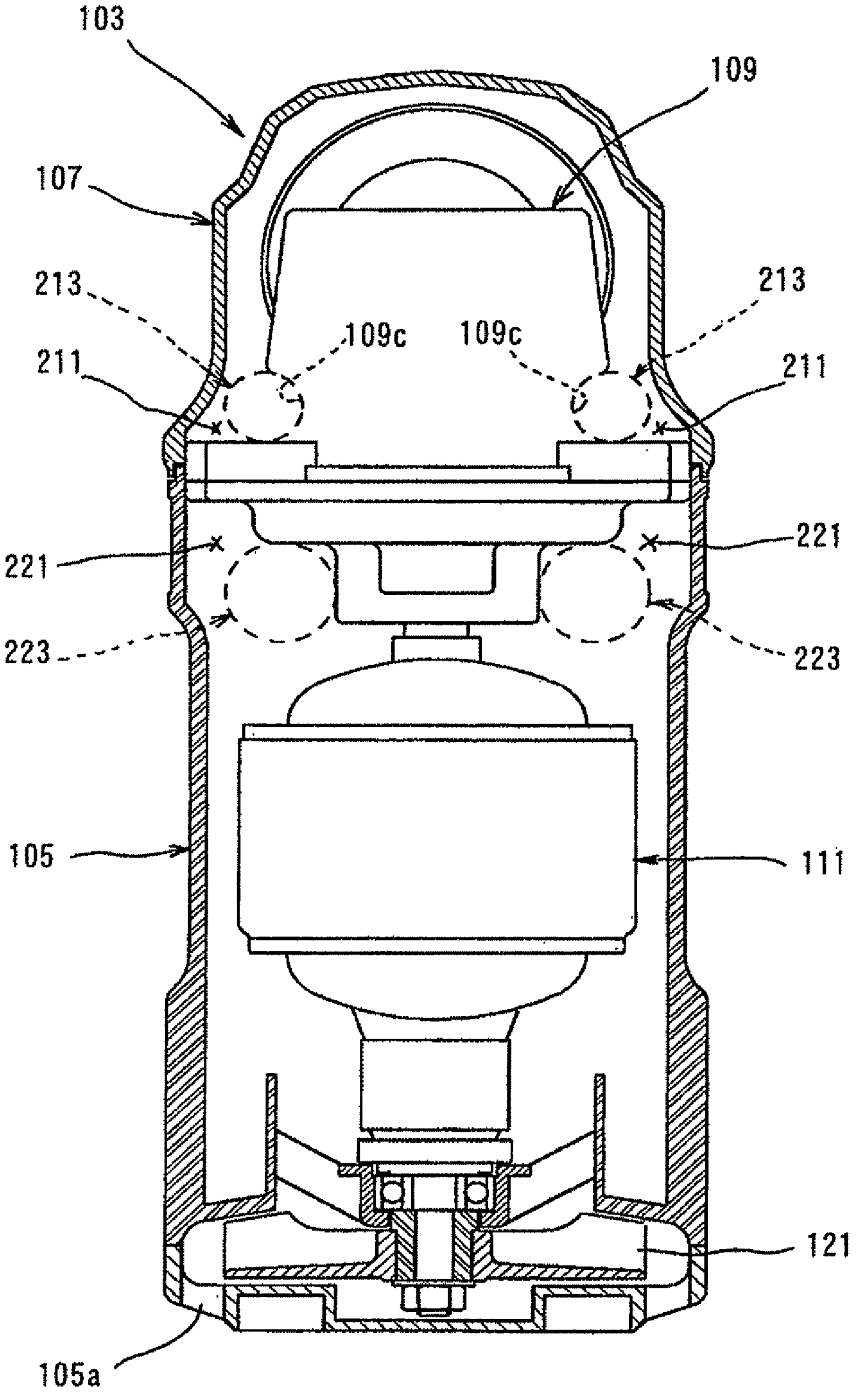
FIG. 5 is a rear view of the hammer drill, with the outer housing shown in section.

In the second representative embodiment, as shown in FIGS. 2B and 5, a dynamic vibration reducer 213 is disposed by utilizing a space in the side regions toward the upper portion within the body 103, or more specifically, right and left spaces 211 existing between the right and left inner wall surfaces of the side regions of the crank housing 107 and the right and left outer wall surfaces of the side regions of the upper housing 109*a*. The spaces 211 correspond to the lower region of the cylinder 141 and extend in a direction parallel to the axis of the cylinder 141 or the longitudinal direction of the cylinder 141. Therefore, in this case, as shown by dashed lines in FIGS. 2B and 5, the dynamic vibration reducer 213 has a cylindrical shape and is disposed such that the direction of movement of the weight or the vibration reducing direction coincides with the longitudinal direction of the hammer bit 119. The dynamic vibration reducer 213 is the same as the first embodiment in the construction, except for the shape, including a body, a weight and biasing springs, which are not shown.

According to the second embodiment, in which the dynamic vibration reducer 213 is placed in the right and left spaces 211 existing between the right and left inner wall surfaces of the side region of the crank housing 107 and the right and left outer wall surfaces of the side region of the upper housing 109*a* like the first embodiment, the dynamic vibration reducer 213 can perform the vibration reducing action in working operation of the hammer drill 101, while avoiding size increase of the body 103. Further, the dynamic vibration reducer 213 can be protected from an outside impact in the event of drop of the hammer drill 101. Especially in the second embodiment, the dynamic vibration reducer 213 is disposed in a side recess 109*c* of the upper housing so that the amount of protrusion of the dynamic vibration reducer 213 from the side of the upper housing 109*a* can be lessened. Therefore, high protection can be provided against an outside impact. The upper housing 109*a* is shaped to minimize the clearance between the mechanism component parts within the upper housing 109*a* and the inner wall surface of the upper housing 109*a*. To this end, the side recess 109*a* is formed in the upper housing 109*a*. Specifically, due to the positional relationship between the cylinder 141 and a driving gear of the motion converting mechanism 113 or the power transmitting mechanism 117 which is located below the cylinder 141, the side recess is defined as a recess formed in the side surface of the upper housing 109*a* and extending in the axial direction of the cylinder 141. The side recess 109*c* is a feature that corresponds to the "recess" according to this invention.

Further, in the second embodiment, the dynamic vibration reducer 213 is placed very close to the center of gravity G of the hammer drill 101 as described above. Therefore, even with a provision of the dynamic vibration reducer 213 in this position, the hammer drill 101 can be held in good balance of weight in the vertical and horizontal directions perpendicular to the longitudinal direction of the hammer bit 119, so that generation of vibration in these vertical and horizontal directions can be effectively lessened or prevented. Moreover, the dynamic vibration reducer 213 is placed relatively close to the axis of the cylinder 141, so that it can perform an effective vibration reducing function against vibration input in working operation of the hammer drill 101.

As shown in FIGS. 2B and 5, the hammer drill 101 having the driving motor 111 includes a cooling fan 121 for cooling the driving motor 111. When the cooling fan 121 is rotated, cooling air is taken in through inlets 125 of a cover 123 that covers the rear surface of the body 103. The cooling air is then led upward within the motor housing 105 and cools the driving motor 111. Thereafter, the cooling air is discharged to the outside through an outlet 105*a* formed in the bottom of the motor housing 105. Such a flow of the cooling air can be relatively easily guided into the region of the dynamic vibration reducer 213. Thus, according to the second embodiment, the dynamic vibration reducer 213 can be advantageously cooled by utilizing the cooling air for the driving motor 111.

Figure 1B:
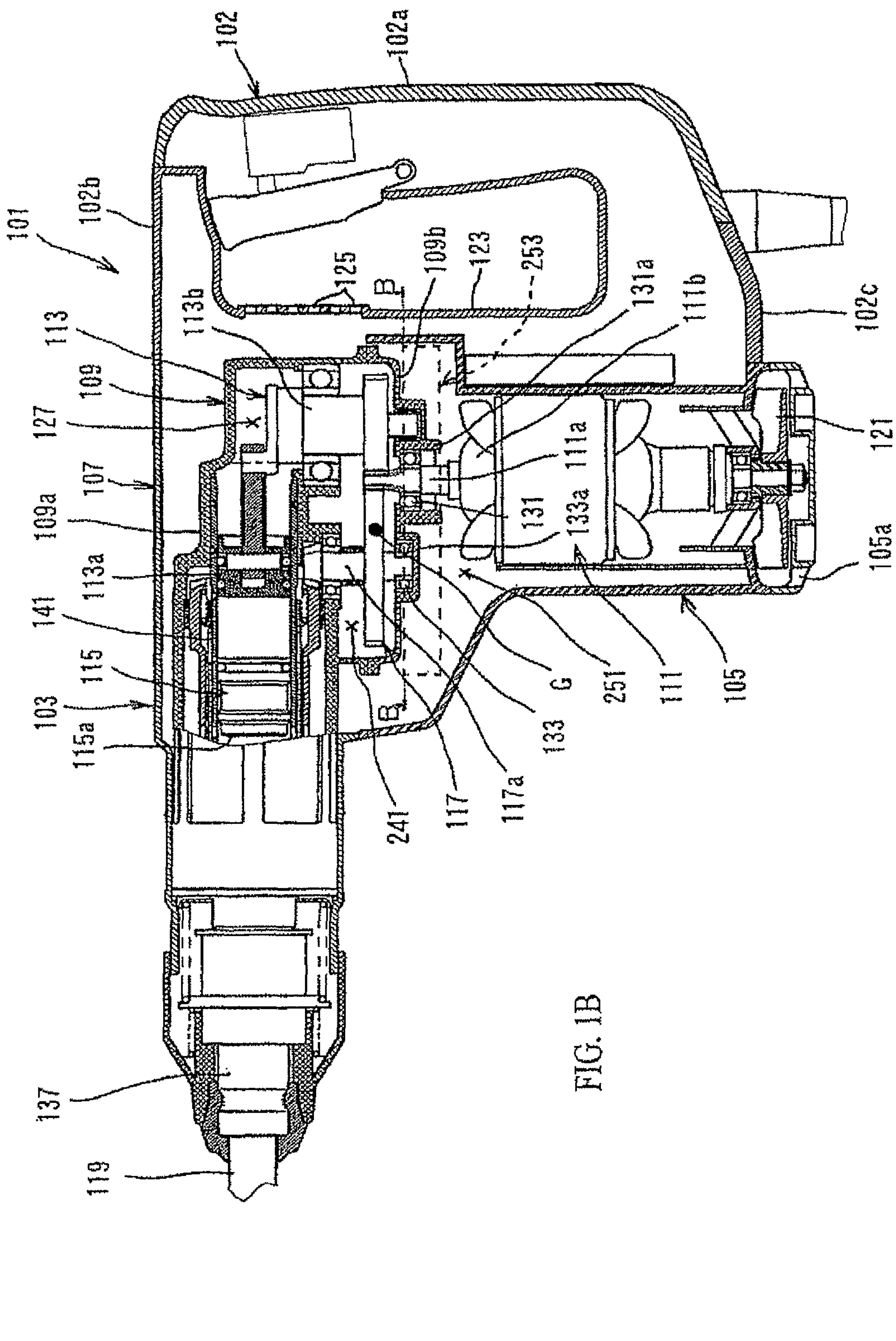
FIG. 1B is a side view showing a hammer drill according to another embodiment of the invention, with an outer housing and an inner housing shown in section.

Further, in the hammer drill 101, when the motion converting mechanism 113 in the inner housing 109 is driven, the pressure within a crank chamber 127 (see FIGS. 1A and 1B) which comprises a hermetic space surrounded by the inner housing 109 fluctuates (by linear movement of the piston 113*a* within the cylinder 141 shown in FIGS. 1A and 1B). By utilizing the pressure fluctuations, a forced vibration method may be used in which a weight is positively driven by introducing the fluctuating pressure into the body of the dynamic vibration reducer 213. In this case, according to the second embodiment, with the construction in which the dynamic vibration reducer 213 is placed adjacent to the inner housing 109 that houses the motion converting mechanism 113, the fluctuating pressure in the crank chamber 127 can be readily introduced into the dynamic vibration reducer 213. Further, when, for example, the motion converting mechanism 113 comprises a crank mechanism as shown in FIGS. 1A and 1B, the construction for forced vibration of a weight of the dynamic vibration reducer 213 can be readily provided by providing an eccentric portion in the crank shaft. Specifically, the eccentric rotation of the eccentric portion is converted into linear motion and inputted as a driving force of the weight in the dynamic vibration reducer 213, so that the weight is forced vibrated.

(Third Embodiment)

Figure 2C:
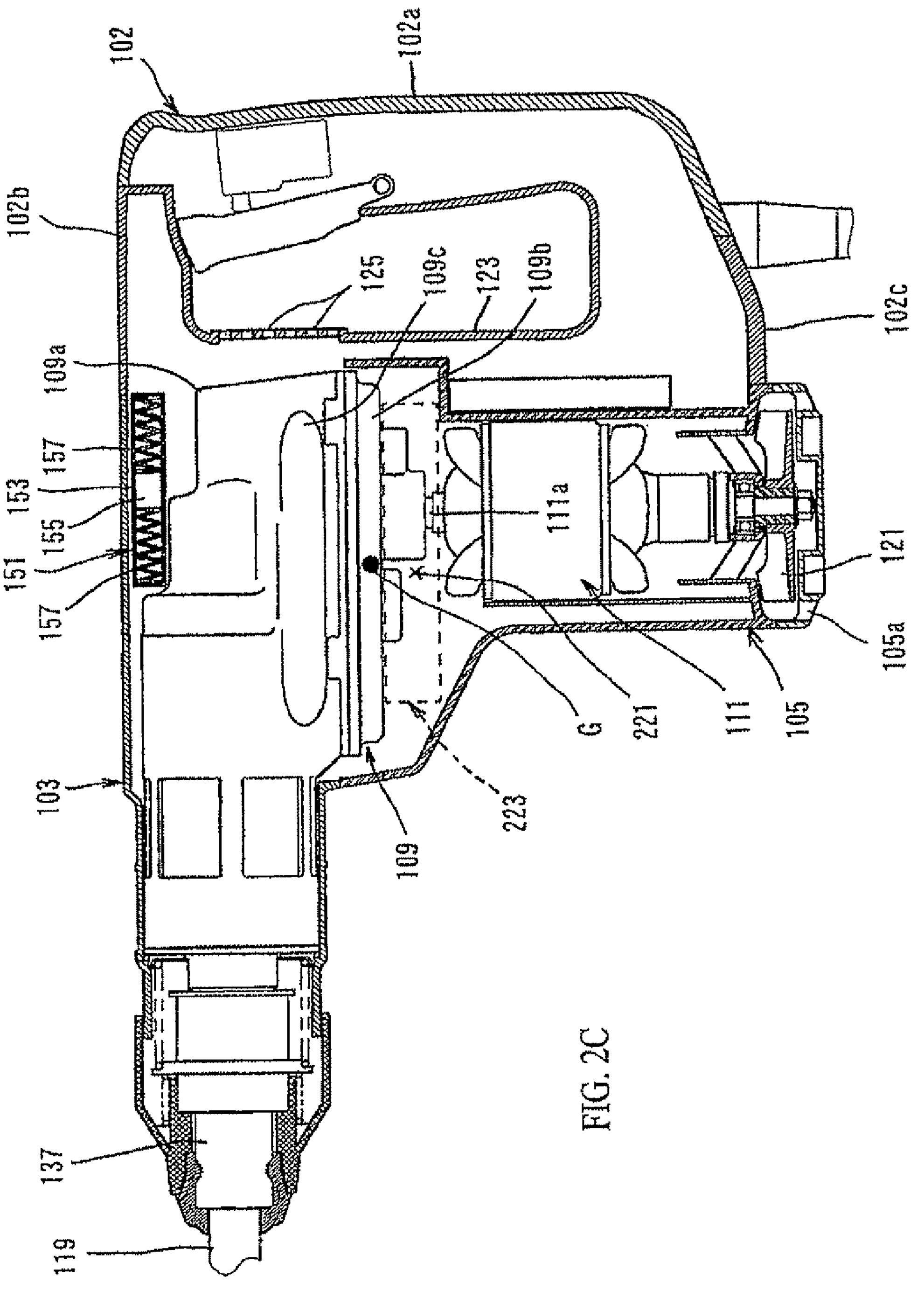
FIG. 2C is a side view of the hammer drill, with the outer housing shown in section according to another embodiment of the invention.

In the third representative embodiment, as shown in FIGS. 2C and 5, a dynamic vibration reducer 223 is disposed by utilizing a space in the side regions within the body 103, or more specifically, a space 221 existing between one axial end (upper end) of the driving motor 111 and the bottom portion of the lower housing 107*b* and extending along the axis of the cylinder 141 (in the longitudinal direction of the hammer bit 119). The space 221 extends in a direction parallel to the axis of the cylinder 141, or in the longitudinal direction. Therefore, in this case, as shown by dashed line in FIGS. 2C and 5, the dynamic vibration reducer 223 has a cylindrical shape and is disposed such that the direction of movement of the weight or the vibration reducing direction coincides with the longitudinal direction of the hammer bit 119. The dynamic vibration reducer 213 is the same as the first embodiment in the construction, except for the shape, including a body, a weight and biasing springs, which are not shown.

According to the third embodiment, in which the dynamic vibration reducer 223 is placed in the space 221 existing between one axial end (upper end) of the driving motor 111 and the lower housing 107*b* like the first and second embodiments, the dynamic vibration reducer 223 can perform the vibration reducing action in working operation of the hammer drill 101, while avoiding size increase of the body 103. Further, the dynamic vibration reducer 223 can be protected from an outside impact in the event of drop of the hammer drill 101.

In the third embodiment, the dynamic vibration reducer 223 is located close to the center of gravity G of the hammer drill 101 like the second embodiment and adjacent to the driving motor 111. Therefore, like the second embodiment, even with a provision of the dynamic vibration reducer 223 in this position, the hammer drill 101 can be held in good balance of weight in the vertical and horizontal directions perpendicular to the longitudinal direction of the hammer bit 119. Moreover, a further cooling effect can be obtained especially because the dynamic vibration reducer 223 is located in the passage of the cooling air for cooling the driving motor 111. Further, although the dynamic vibration reducer 223 is located at a slight more distance from the crank chamber 127 compared with the second embodiment, the forced vibration method can be relatively easily realized in which a weight is positively driven by introducing the fluctuating pressure of the crank chamber into the dynamic vibration reducer 223.

(Fourth Embodiment)

Figure 2D:
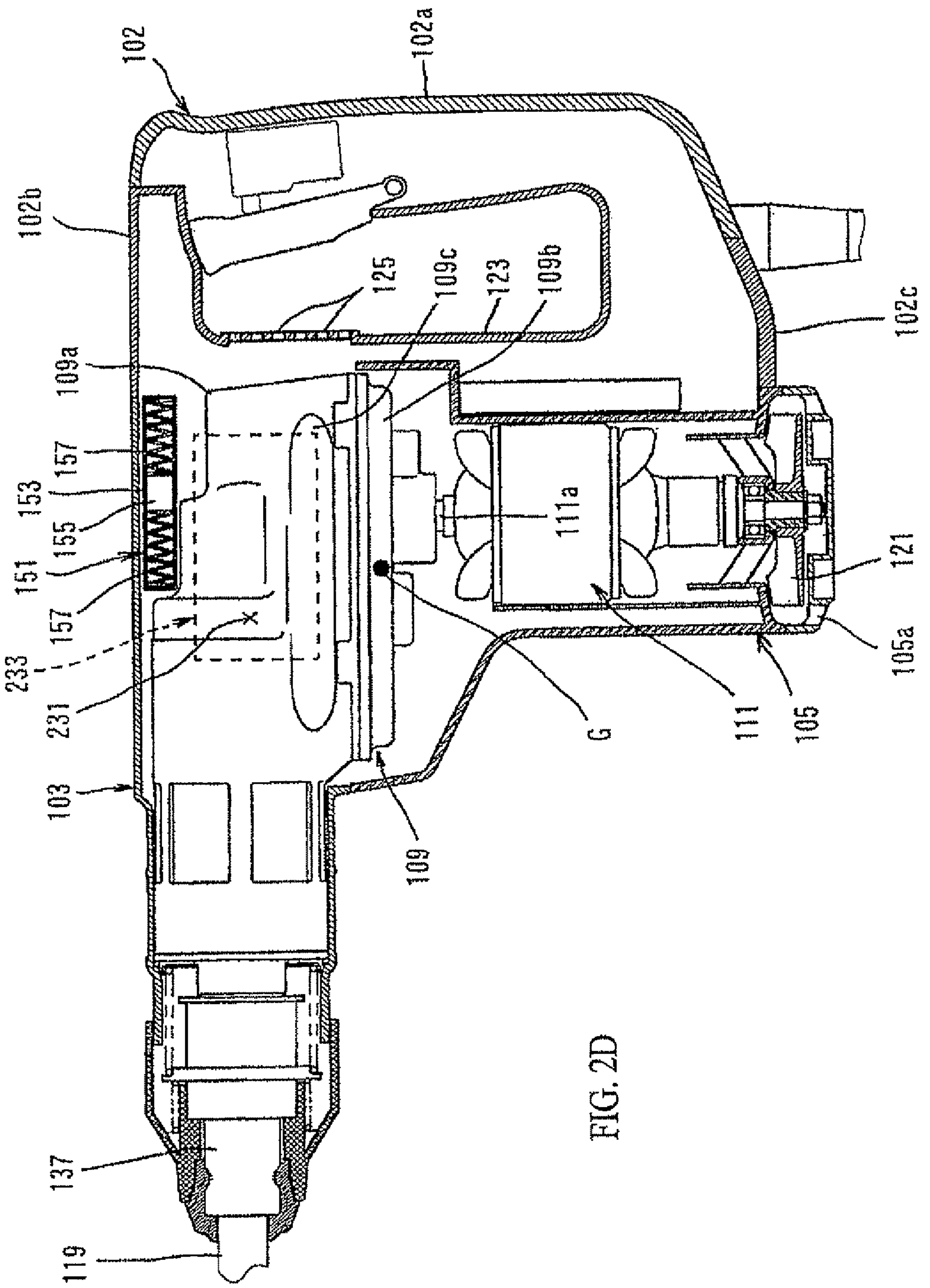
FIG. 2D is a side view of the hammer drill, with the outer housing shown in section according to another embodiment of the invention.
Figure 2E:
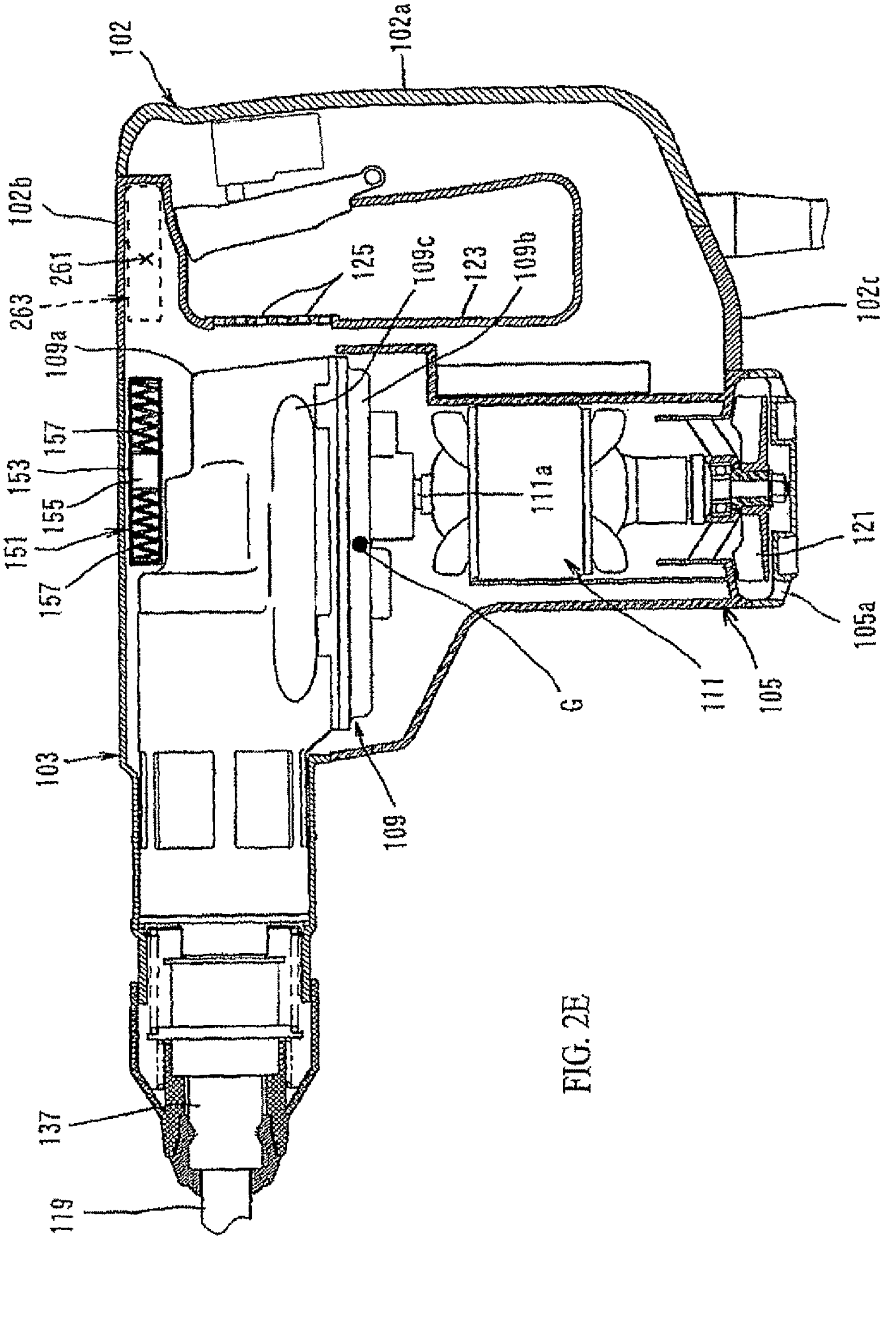
FIG. 2E is a side view of the hammer drill, with the outer housing shown in section according to another embodiment of the invention.
Figure 2F:
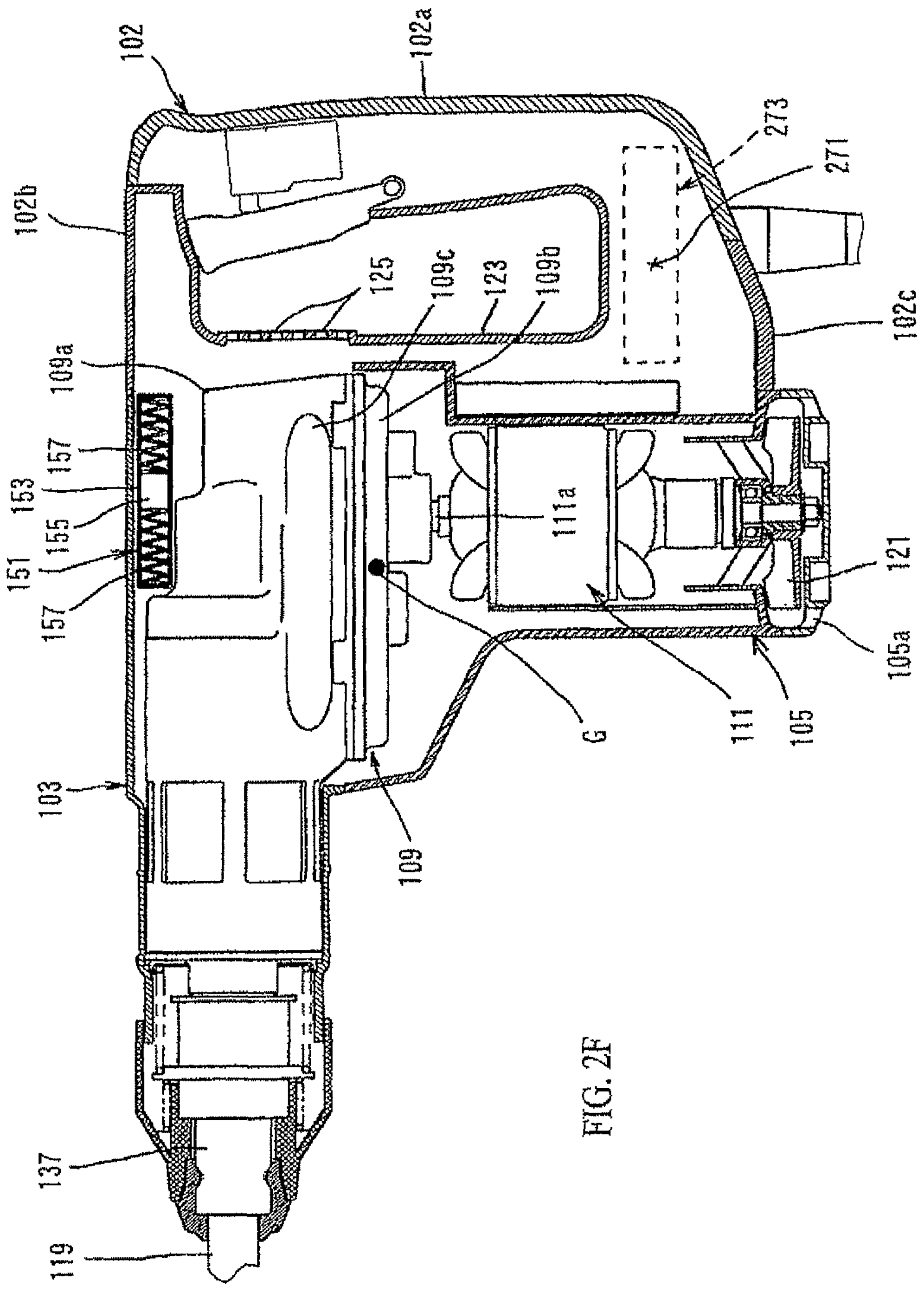
FIG. 2F is a side view of the hammer drill, with the outer housing shown in section according to another embodiment of the invention.
Figure 4:
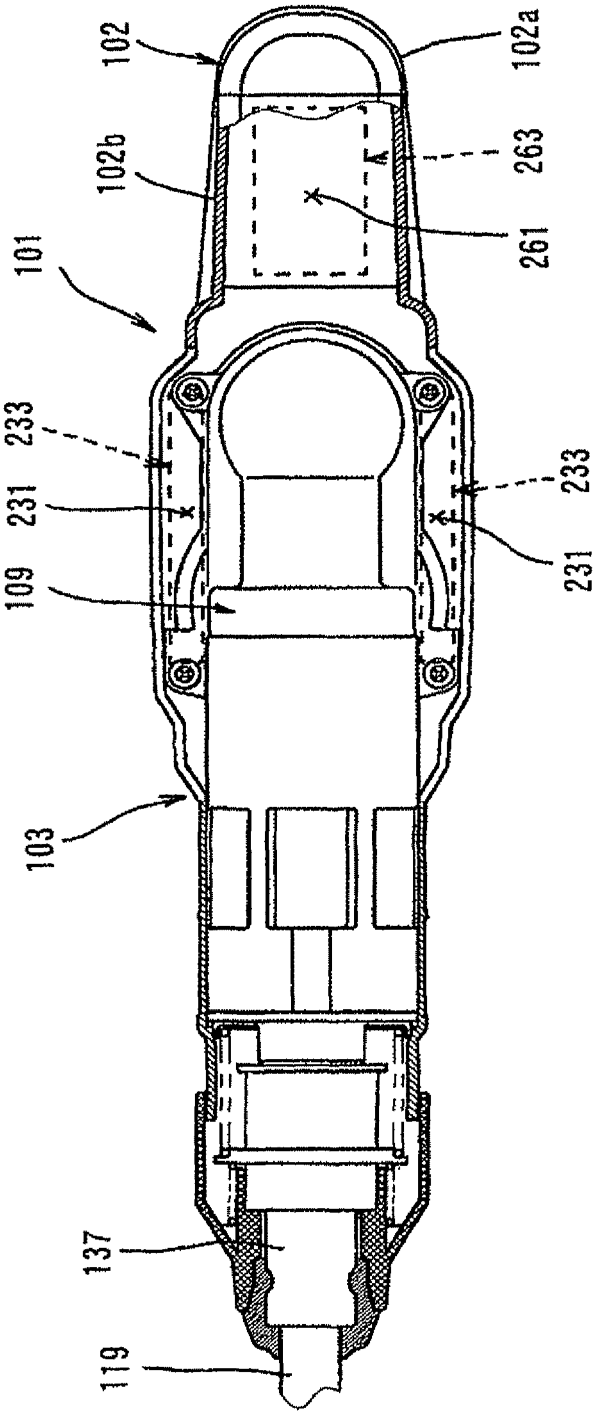
FIG. 4 is a plan view of the hammer drill, with the outer housing shown in section.

In the fourth representative embodiment, as shown in FIGS. 2D and 4, a dynamic vibration reducer 233 is disposed by utilizing a space existing in the right and left side upper regions within the body 103, or more specifically, a space 231 existing between the right and left inner wall surfaces of the side regions of the crank housing 107 and the right and left outer wall surfaces of the side regions of the upper housing 109*a* of the inner housing 109. The space 231 is relatively limited in lateral width due to the narrow clearance between the inner wall surfaces of the crank housing 107 and the outer wall surfaces of the upper housing 109*a,* but it is relatively wide in the longitudinal and vertical directions, Therefore, in this embodiment, the dynamic vibration reducer 233 has a shape conforming to the space 231. Specifically, as shown by dashed line in FIGS. 2D and 4, the dynamic vibration reducer 233 has a box-like shape short in the lateral direction and long in the longitudinal and vertical directions and is disposed such that the direction of movement of the weight or the vibration reducing direction coincides with the longitudinal direction of the hammer bit 119. The dynamic vibration reducer 233 is the same as the first embodiment in the construction, except for the shape, including a body, a weight and biasing springs, which are not shown.

According to the fourth embodiment, in which the dynamic vibration reducer 233 is placed in the space 231 existing between the right and left inner wall surfaces of the side regions of the crank housing 107 and the right and left outer wall surfaces of the side regions of the upper housing 109*a* of the inner housing 109, like the above-described embodiments, the dynamic vibration reducer 233 can perform the vibration reducing action in working operation of the hammer drill 101, while avoiding size increase of the body 103. Further, the dynamic vibration reducer 233 can be protected from an outside impact in the event of drop of the hammer drill 101. Especially, the dynamic vibration reducer 233 of the fourth embodiment occupies generally the entirety of the space 231 existing between the inner wall surfaces of the side regions of the crank housing 107 and the outer wall surfaces of the side regions of the upper housing 109*a.* The dynamic vibration reducer 233 in the space 231 is located closest to the axis of the cylinder 141 among the above-described embodiments, so that it can perform a more effective vibration reducing action against vibration input in working operation of the hammer drill 101.

(Fifth Embodiment)

Figure 6:
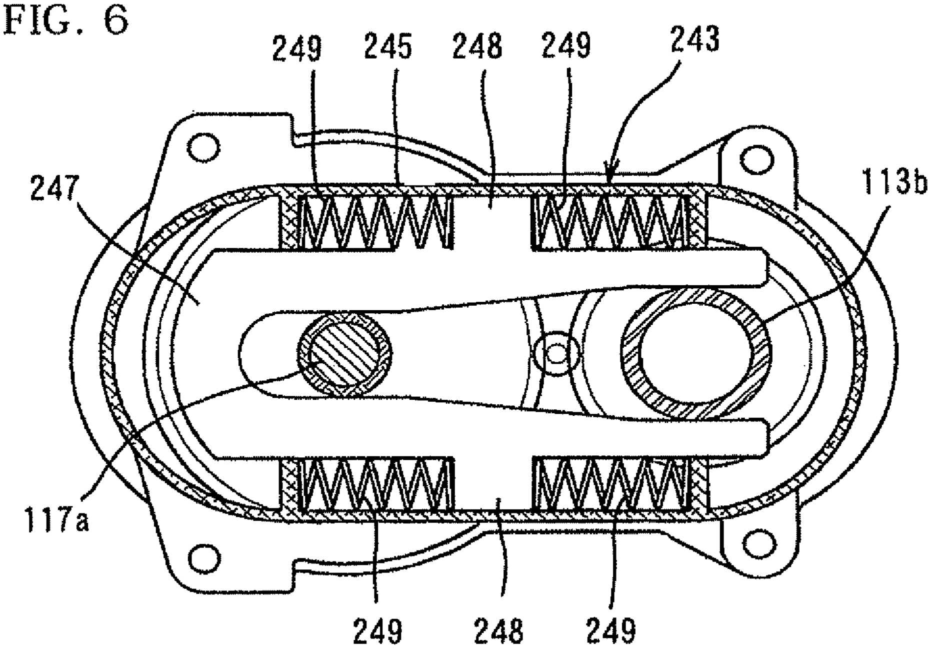
FIG. 6 is a sectional view taken along line A-A in FIG. 1A.

In the fifth representative embodiment, as shown in FIGS. 1A and 6, a dynamic vibration reducer 243 is disposed in a space existing inside the body 103, or more specifically, in the crank chamber 127 which comprises a hermetic space within the inner housing 109 that houses the motion converting mechanism 113 and the power transmitting mechanism 117. More specifically, as shown by dotted line in FIG. 1A, the dynamic vibration reducer 243 is disposed in the vicinity of the joint between the upper housing 109*a* and the lower housing 109*b* of the inner housing 109 by utilizing a space 241 existing between the inner wall surface of the inner housing 109 and the motion converting mechanism 113 and power transmitting mechanism 117 within the inner housing 109. The dynamic vibration reducer 243 is disposed such that the vibration reducing direction coincides with the longitudinal direction of the hammer bit 119.

In order to dispose the dynamic vibration reducer 243 in the space 241, as shown in FIG. 6 in sectional view, a body 245 of the dynamic vibration reducer 243 is formed into an oval (elliptical) shape in plan view which conforms to the shape of the inner wall surface of the upper housing 109*a* of the inner housing 109. A weight 247 is disposed within the vibration reducer body 245 and has a generally horseshoe-like shape in plan view. The weight 247 is disposed for sliding contact with a crank shaft 113*b* of the motion converting mechanism 113 and a gear shaft 117*a* of the power transmitting mechanism 117 in such a manner as to pinch them from the both sides. Thus, the weight 247 can move in the longitudinal direction (in the axial direction of the cylinder 141). Specifically, the crank shaft 113*b* and the gear shaft 117*a* are utilized as a member for guiding the movement of the weight 247 in the longitudinal direction. Projections 248 are formed on the right and left sides of the weight 247, and the biasing springs 249 are disposed on the opposed sides of the projections 248. Specifically, the biasing springs 249 connect the weight 247 to the vibration reducer body 243. When the weight 247 moves in the longitudinal direction of the vibration reducer body 243 (in the axial direction of the cylinder 141), the biasing springs 249 apply a spring force to the weight 247 in the opposite direction.

According to the fifth embodiment, in which the dynamic vibration reducer 243 is placed in the space 241 existing within the inner housing 109, like the above-described embodiments, the dynamic vibration reducer 243 can perform the vibration reducing action in working operation of the hammer drill 101, while avoiding size increase of the body 103. Further, the dynamic vibration reducer 243 can be protected from an outside impact in the event of drop of the hammer drill 101.

Further, in the fifth embodiment, the dynamic vibration reducer 243 is placed very close to the center of gravity G of the hammer drill 101 as described above. Therefore, even with a provision of the dynamic vibration reducer 243 in such a position, as explained in the second embodiment, the hammer drill 101 can be held in good balance of weight in the vertical and horizontal directions perpendicular to the longitudinal direction of the hammer bit 119, so that generation of vibration in these vertical and horizontal directions can be effectively lessened or prevented. Moreover, the dynamic vibration reducer 243 is placed relatively close to the axis of the cylinder 141, so that it can effectively perform a vibration reducing function against vibration caused in the axial direction of the cylinder 141 in working operation of the hammer drill 101. Further, the space surrounded by the inner housing 109 forms the crank chamber 127. Thus, with the construction in which the dynamic vibration reducer 243 is disposed within the crank chamber 127, when the forced vibration method is used in which the weight 247 of the dynamic vibration reducer 243 is forced to vibrate by utilizing the pressure fluctuations of the crank chamber 127, the crank chamber 127 can be readily connected to the space of the body 245 of the dynamic vibration reducer 243.

(Sixth Embodiment)

Figure 7:
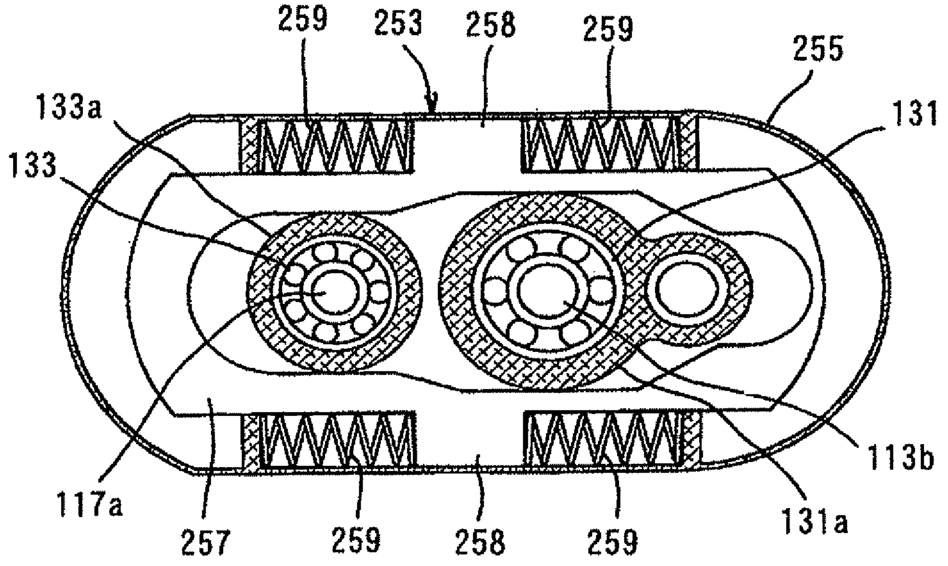
FIG. 7 is a sectional view taken along line B-B in FIG. 1B.

In the sixth representative embodiment, as shown in FIGS. 1B and 7, a dynamic vibration reducer 253 is placed by utilizing a space existing inside the body 103, or more specifically, a space 251 existing in the upper portion of the motor housing 105. Therefore, the sixth embodiment can be referred to as a modification of the second embodiment. In the sixth embodiment, as shown by dotted line in FIG. 1B, the dynamic vibration reducer 243 is disposed by utilizing the space 251 between the upper end of the rotor 111*b* of the driving motor 111 and the underside of the lower housing 109*b* of the inner housing 109. To this end, as shown in FIG. 7, a body 255 of the dynamic vibration reducer 253 is formed into an oval (elliptical) shape in sectional plan view, and a weight 257 is formed into a generally elliptical ring-like shape in plan view. The weight 257 is disposed for sliding contact with bearing receivers 131*a* and 133*a* in such a manner as to pinch them from the both sides and can move in the longitudinal direction (in the axial direction of the cylinder 141). The bearing receiver 131 a receives a bearing 131 that rotatably supports the output shaft 111*a* of the driving motor 111, and the bearing receiver 133*a* receives a bearing 133 that rotatably supports the gear shaft 117*a* of the motion converting mechanism 117. The bearing receivers 131*a* and 133*a* are also utilized as a member for guiding the movement of the weight 257 in the longitudinal direction. Further, projections 258 are formed on the right and left sides of the weight 257, and the biasing springs 259 are disposed on the opposed sides of the projections 258. Specifically, the biasing springs 259 connect the weight 257 to the vibration reducer body 253. When the weight 257 moves in the longitudinal direction of the vibration reducer body 253 (in the axial direction of the cylinder 141), the biasing springs 259 apply a spring force to the weight 257 in the opposite direction.

According to the sixth embodiment, in which the dynamic vibration reducer 253 is placed in the space 251 existing within the motor housing 105, like the above-described embodiments, the dynamic vibration reducer 253 can perform the vibration reducing action in the working operation of the hammer drill 101, while avoiding size increase of the body 103. Further, the dynamic vibration reducer 253 can be protected from an outside impact in the event of drop of the hammer drill 101.

Further, in the sixth embodiment, the dynamic vibration reducer 253 is placed close to the center of gravity G of the hammer drill 101 as described above. Therefore, even with a provision of the dynamic vibration reducer 243 in such a position, as explained in the second embodiment, the hammer drill 101 can be held in good balance of weight in the vertical and horizontal directions perpendicular to the longitudinal direction of the hammer bit 119, so that generation of vibration in these vertical and horizontal directions can be effectively lessened or prevented. Further, the lower position of the lower housing 109*b* is very close to the crank chamber 127. Therefore, when the method of causing forced vibration of the dynamic vibration reducer 253 is applied, the fluctuating pressure in the crank chamber 127 can be readily introduced into the dynamic vibration reducer 253. Moreover, the construction for causing forced vibration of the weight 257 can be readily provided by providing an eccentric portion in the crank shaft 113*b* of the motion converting mechanism 113. Specifically, the eccentric rotation of the eccentric portion is converted into linear motion and inputted as a driving force of the weight 257 in the dynamic vibration reducer 253, so that the weight 257 is forced vibrated.

(Seventh Embodiment)

In the seventh representative embodiment, as shown in FIGS. 2E to 4, a dynamic vibration reducer 263 is disposed by utilizing a space existing inside the 102. As described above, the 102 includes a grip 102*a* to be held by the user and an upper and a lower connecting portions 102*b*, 102*c* that connect the grip 102*a* to the body 103. The upper connecting portion 102*b* is hollow and extends to the body 103. In the seventh embodiment, a dynamic vibration reducer 263 is disposed in a space 261 existing within the upper connecting portion 102*b* and extending in the longitudinal direction (in the axial direction of the cylinder 141). As shown by dotted line in FIGS. 2E to 4, the dynamic vibration reducer 263 has a rectangular shape elongated in the longitudinal direction. The dynamic vibration reducer 263 is the same as the first embodiment in the construction, except for the shape, including a body, a weight and biasing springs, which are not shown.

According to the seventh embodiment, in which the dynamic vibration reducer 263 is disposed in the space 261 existing inside the 102, like the above-described embodiments, the dynamic vibration reducer 263 can perform the vibration reducing action in working operation of the hammer drill 101, while avoiding size increase of the body 103. Further, the dynamic vibration reducer 263 can be protected from an outside impact in the event of drop of the hammer drill 101. Especially in the seventh embodiment, the dynamic vibration reducer 263 is disposed in the space 261 of the upper connecting portion 102*b* of the 102, which is located relatively close to the axis of the cylinder 141. Therefore, the vibration reducing function of the dynamic vibration reducer 263 can be effectively performed against vibration in the axial direction of the cylinder in working operation of the hammer drill 101.

Generally, in the case of the hammer drill 101 in which the axis of the driving motor is generally perpendicular to the axis of the cylinder 141, the handgrip 102 is designed to be detachable from the rear end of the body 103. Therefore, when, like this embodiment, the dynamic vibration reducer 263 is disposed in the space 261 of the connecting portion 102*b* of the handgrip 102, the dynamic vibration reducer 263 can be mounted in the 102 not only in the manufacturing process, but also as a retrofit at the request of a purchaser.

(Eighth Embodiment)

In the eighth representative embodiment, like the seventh embodiment, a dynamic vibration reducer 273 is disposed by utilizing a space existing inside the 102. Specifically, as shown by dotted line in FIG. 2F, the dynamic vibration reducer 273 is disposed by utilizing a space 271 existing within the lower connecting portion of the handgrip 102*c*. Like the above-described space 261 of the upper connecting portion 102*b*, the space 271 of the lower connecting portion 102*c* extends in the longitudinal direction (in the axial direction of the cylinder 141). Therefore, as shown by dotted line in FIG. 2F, the dynamic vibration reducer 273 has a rectangular shape elongated in the longitudinal direction. The dynamic vibration reducer 273 is the same as the first embodiment in the construction, except for the shape, including a body, a weight and biasing springs, which are not shown.

According to the eighth embodiment, in which the dynamic vibration reducer 273 is disposed in the space 271 existing inside the 102, like the above-described embodiments, the dynamic vibration reducer 273 can perform the vibration reducing action in operation of the hammer drill 101, while avoiding size increase of the body 103. Further, the dynamic vibration reducer 273 can be protected from an outside impact in the event of drop of the hammer drill 101. Further, if the 102 is designed to be detachable from the body 103, like the seventh embodiment, the dynamic vibration reducer 273 can be mounted in the handgrip 102 not only in the manufacturing process, but also as a retrofit at the request of a purchaser.

In the above-described embodiments, an electric hammer drill has been described as a representative example of the power tool. However, other than the hammer drill, this invention can not only be applied, for example, to an electric hammer in which the hammer bit 119 performs only a hammering movement, but to any power tool, such as a reciprocating saw and a jigsaw, in which a working operation is performed on a workpiece by reciprocating movement of the tool bit.

The invention claimed is:

1. A power tool comprising:

a housing, a motor housed in the housing, an internal mechanism driven by the motor, the internal mechanism including a motion converting mechanism and a power transmitting mechanism, an internal mechanism chamber provided formed within the housing to house at least a part of the internal mechanism, a tool bit disposed in one end of the housing and driven by the internal mechanism in the longitudinal direction of the tool bit to perform a predetermined operation, a handgrip connected to the other end of the housing, and a dynamic vibration reducer including a weight and an elastic element, the elastic element being adapted to apply a biasing force to the weight, wherein the weight reciprocates in the longitudinal direction of the tool bit against the biasing force of the elastic element, whereby the dynamic vibration reducer reduces vibration which is caused in the housing in the longitudinal direction of the tool bit in the working operation, and wherein the dynamic vibration reducer including the weight and the elastic member is located in a hermetic space within the internal mechanism chamber, wherein:

the elastic element includes a first spring and a second spring, the first spring being mounted on one single side of the weight in the forward and rearward directions, the second spring being mounted on another single side of the weight in the forward and rearward directions; and each of the first spring and second spring includes two separate springs flanking the corresponding single side of the weight.

2. The power tool according to claim 1, wherein the internal mechanism chamber is provided as the hermetic space.

3. The power tool according to claim 1, wherein the motion converting mechanism is defined by a crank mechanism and the internal mechanism chamber is provided as the hermetic space and as a crank chamber that houses at least the crank mechanism.

4. The power tool according to claim 1, wherein the power tool as a hammer drill comprising:

a hammer mechanism driven by the motor;

wherein:

the weight is slidable in forward and rearward directions between a first end position and a second end position;

the elastic element biases the weight to a third position located between the first and second end positions, the housing, motor, hammer mechanism, weight and the elastic element are configured to define a center of gravity of the hammer drill;

the weight provides a sufficient mass and the elastic element provides a sufficient biasing force such that sliding movement of the weight acts to:

at least partially counteract vibrations of the hammer drill, and at least partially counteract twisting movement of the hammer drill about the center of gravity; and the two springs do not overlap each other in a longitudinal direction of the hammer mechanism and in plan view of the weight.

5. The power tool as claimed in claim 4, wherein the hammer mechanism includes a piston and a striking element moveable along an axis of travel, the weight being located above the axis of travel.

6. The power tool as claimed in claim 5, wherein the axis of travel is located above the center of gravity.

7. The power tool as claimed in claim 4, wherein the sliding movement of the weight acts to at least partially counteract a twisting movement of the hammer drill along an axis substantially perpendicular to a movement of the hammer mechanism passing through the center of gravity.

8. The power tool as claimed in claim 5, wherein the sliding movement of the weight acts to at least partially counteract a twisting movement of the hammer drill along an axis substantially perpendicular to a movement of the hammer mechanism passing through the center of gravity.

9. The power tool as claimed in claim 4, wherein the sliding movement of the weight acts to at least partially counteract a twisting movement of the hammer drill along an axis substantially parallel to a movement of the hammer mechanism and an axis substantially perpendicular to the movement of the hammer mechanism passing through the center of gravity.

10. The power tool as claimed in claim 9, wherein a substantially horizontal axis is substantially perpendicular to the direction of travel of the weight.

11. The power tool as claimed in claim 4, wherein the weight is suspended by the elastic element.

12. The power tool as claimed in claim 4, wherein the hammer mechanism is driven by the motor in a reciprocating motion along a first axis that is spaced a first perpendicular distance from a center of mass, and the weight moves along a second axis that is spaced a second perpendicular distance from the center of gravity.

13. The power tool as defined in claim 1, wherein a pair of dynamic vibration reducers are provided respectively at both sides of the weight.

14. The power tool as claimed in claim 1, wherein the weight of the dynamic vibration reducer is defined by a single weight.

15. The power tool as claimed in claim 1, wherein the weight of the dynamic vibration reducer has a plate like shape.

16. The power tool as claimed in claim 1, wherein the weight of the dynamic vibration reducer is defined by a single weight and the single weight has a plate like shape.

17. The power tool as claimed in claim 1, wherein the two springs do not overlap each other in a longitudinal direction of the dynamic vibration reducer and in plan view of the weight.

* * * * *